Figure 1:
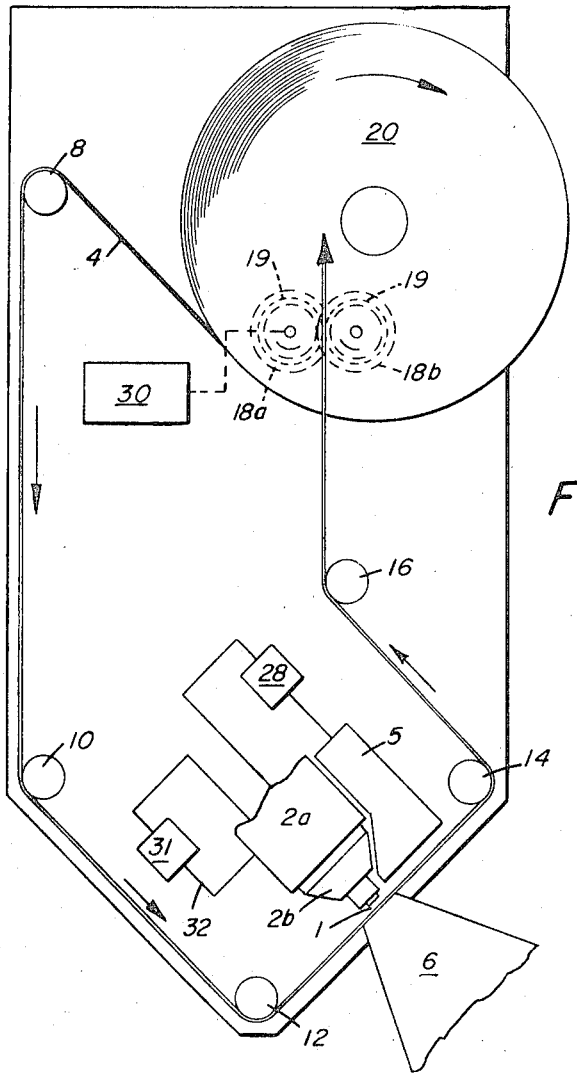
Figure 2:
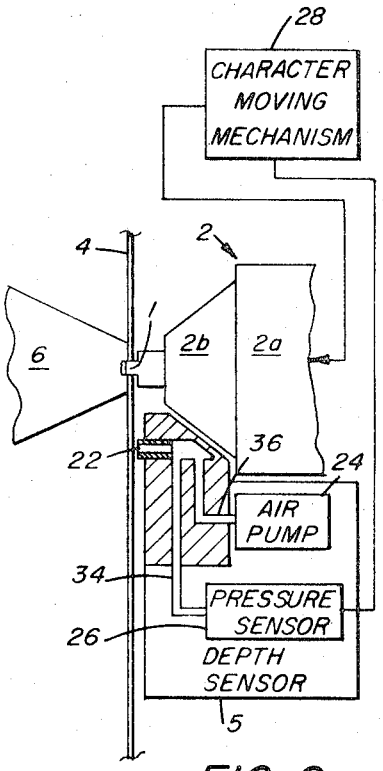

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 5

T909,002
IDENTIFICATION PRINTER FOR PLASTIC PARTS

Neil S. White and Richard R. Mosman, both of 1669 Lake Ave., Rochester, N.Y. 14650

Filed Mar. 2, 1972, Ser. No. 231,213
Int. Cl. B44b 7/00
U.S. Cl. 101—27
1 Sheet Drawing. 7 Pages Specification

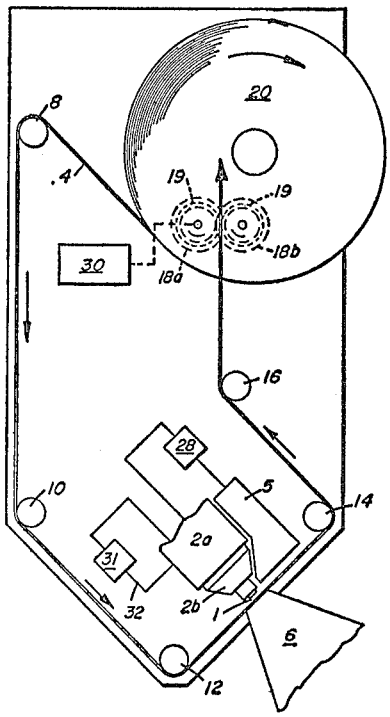

An identification printer for embossing or imprinting a character such as a number into a plastic part wherein a heated die having a projecting character is moved by any suitable mechanism from a normal retracted position to an imprinting position, in which the die character penetrates and imprints a corresponding character into the part. A mechanism for controlling the depth of the imprint comprises a longitudinally adjustable probe movable with the die, a low pressure air supply for supplying a continuous stream of air through the probe, and a fluid pressure sensor for sensing the air pressure in the probe, and in response to a predetermined pressure, deactivating the die moving mechanism. The predetermined pressure is generated when the probe is moved to a preselected distance from any suitable surface corresponding to a desired depth of penetration of the die character into the part. The die moving mechanism, when deactivated, returns to its normal retracted position. To imprint colored characters into a plastic part, a colored printing tape in web form is pulled from a stockroll and is suitably guided between the heated die character and the part.

IDENTIFICATION PRINTER FOR PLASTIC PARTS

Filed March 2, 1972